(12) United States Patent
Doan et al.

(10) Patent No.: US 11,567,845 B2
(45) Date of Patent: Jan. 31, 2023

(54) SERIAL DATA BUS NODE IDENTIFICATION SYSTEM

(71) Applicant: RAYTHEON COMPANY, Waltham, MA (US)

(72) Inventors: Erin K. Doan, Highlands Ranch, CO (US); Matthew R. Danielson, Fort Collins, CO (US); Addison M. Moran, Littleton, CO (US); Michael J. Worden, Centennial, CO (US)

(73) Assignee: RAYTHEON COMPANY, Waltham, MA (US)

( * ) Notice: Subject to any disclaimer, the term of this patent is extended or adjusted under 35 U.S.C. 154(b) by 588 days.

(21) Appl. No.: 16/574,241

(22) Filed: Sep. 18, 2019

(65) Prior Publication Data

US 2020/0110679 A1    Apr. 9, 2020

Related U.S. Application Data

(60) Provisional application No. 62/740,643, filed on Oct. 3, 2018.

(51) Int. Cl.
| | | |
|---|---|---|
| G06F 11/00 | (2006.01) | |
| G06F 11/26 | (2006.01) | |
| G06F 11/22 | (2006.01) | |
| G06F 13/42 | (2006.01) | |
| G06F 11/34 | (2006.01) | |
| G06F 11/30 | (2006.01) | |

(52) U.S. Cl.
CPC ........... *G06F 11/26* (2013.01); *G06F 11/221* (2013.01); *G06F 11/3027* (2013.01); *G06F 11/349* (2013.01); *G06F 13/4282* (2013.01)

(58) Field of Classification Search
CPC .... G06F 11/2257; G06F 11/221; G06F 11/26; G06F 11/263; G06F 11/3027; G06F 11/349

See application file for complete search history.

(56) References Cited

U.S. PATENT DOCUMENTS

| | | | |
|---|---|---|---|
| 9,160,543 B2 | 10/2015 | Kimberly | |
| 2006/0150018 A1* | 7/2006 | Cousin | G06F 11/2257 714/26 |
| 2006/0178791 A1* | 8/2006 | Fountain | G06F 11/263 702/123 |
| 2007/0076616 A1 | 4/2007 | Ngo et al. | |

(Continued)

OTHER PUBLICATIONS

International Search Report and Written Opinion for International Application No. PCT/US2019/050363; Application Filing Date Sep. 10, 2019; dated May 13, 2020 (16 pages).

(Continued)

*Primary Examiner* — Charles Ehne
(74) *Attorney, Agent, or Firm* — Cantor Colburn LLP (57) ABSTRACT

A vehicle includes a data communication network, a serial data bus, and a plurality of electronic nodes in signal communication with the serial data bus. The vehicle further includes a node identification system configured to store a several different diagnostic tests, along with expected operating data corresponding to a given diagnostic test. The node identification system sorts the plurality of nodes into individual node groups in response to performing one or more diagnostic tests among the different available diagnostic tests.

16 Claims, 6 Drawing Sheets

(56) References Cited

U.S. PATENT DOCUMENTS

2008/0005628 A1* 1/2008 Underdal .............. G06N 5/003
  714/57
2017/0187539 A1 6/2017 Thompson et al.

OTHER PUBLICATIONS

Wilbur Place: "MIL-STD-1553 Designer's Guide", Sixt Edition, XP055462493 <URL: http://www.ddc-web.com/Documents/dguidehg.pdf> [retrieved from the internet on Mar. 23, 2018] (367 pages).
"A Strategic Blueprint for Construction Excellence" Department of Design and Construction <URL https://www1.nyc.gov/assets/ddc/images/content/pages/press-releases/2019/2019_DDC_Strategic_Plan.pdf> [retrieved Sep. 5, 2019] (27 pages).

* cited by examiner

SERIAL DATA BUS NODE IDENTIFICATION SYSTEM

DOMESTIC PRIORITY

This application claims priority to U.S. Application Ser. No. 62/740,643 filed Oct. 3, 2018, the contents of which are incorporated by reference herein in its entirety.

BACKGROUND

Various non-limiting embodiments relate generally to vehicle communication networks, and more particular, to aircrafts including a serial data bus.

Military vehicles typically employ a standardized serial data bus to facilitate communication between various on-board components and sub-systems typically referred to as remote terminals or nodes. The MIL-STD-1553 data bus is an example of a serial data bus implemented on military aircraft. The MIL-STD-1553 standard specifies all of the electrical characteristics of the receivers, transmitters, and cable used to implement the bus, as well as the complete message transmission protocol. The MIL-STD-1553 data bus aims to achieve hard real time communications, where a message is expected to be communicated over the bus in a deterministic way with known latency and very low probability that the message is not decoded successfully. For example, a MIL-STD-1553 data bus can be employed to exchange data messages associated with flight critical avionics, flight control, weapons, electrical power control, and propulsion control.

The MIL-STD-1553 data bus defines electrical and signaling characteristics for 1 Mbps communications between a bus controller and one or more nodes. Data messages are communicated over an asynchronous serial, command/response digital data bus. The data bus utilizes a twisted wire cable pair to construct a data transmission medium on which the data messages are time division multiplexed and delivered as data frames.

SUMMARY

According to a non-limiting embodiment, a vehicle includes a data communication network. The data communication network comprises a serial data bus, a plurality of electronic nodes in signal communication with the serial data bus, and a node identification system. The node identification system is configured to store a plurality of diagnostic tests and expected operating data corresponding to a given diagnostic test among the plurality of diagnostic tests. The node identification system is further configured to sort the plurality of nodes into individual node groups in response to performing one or more diagnostic tests among the plurality of diagnostic tests.

According to another non-limiting embodiment, a data communication network is installed on a vehicle. The data communication network comprises a serial data bus having a plurality of electronic nodes connected thereto, and a node identification system in signal communication with the serial data bus. The serial data bus diagnostic system is configured to store a plurality of diagnostic tests and expected operating data corresponding to a given diagnostic test among the plurality of diagnostic tests, and to sort the plurality of nodes into individual node groups in response to performing one or more diagnostic tests among the plurality of diagnostic test.

According to yet another non-limiting embodiment, a method is provided to identify a plurality of nodes installed on a vehicle. The method comprises connecting a plurality of electronic nodes to serial data bus, storing, via a node identification system that is in signal communication with the serial data bus, a plurality of diagnostic tests. The method further comprises storing, via the node identification system, expected operating data corresponding to a given diagnostic test among the plurality of diagnostic tests. The method further includes initiating at least one of the diagnostic tests such that the nodes output operating data, and sorting the plurality of nodes into individual node groups based on the output operating data.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Vehicle serial data buses such as the MIL-STD-1553 data bus allow for adding and/or removing nodes. For instance, a faulty node can be replaced with a new node, or a legacy node can be replaced with an up-to-date node. Due to the ability to add or replace nodes, the security of the serial data bus can be compromised if an authorized node is replaced with an unauthorized node or if an unauthorized node is added to the bus. Therefore, conventional vehicle serial data bus such as the MIL-STD-1553 data bus cannot readily identify newly added nodes or replaced nodes on the serial data bus, and therefore, may not detect when one or more critical vehicle systems have been compromised.

Various non-limiting embodiments described herein provide a vehicle serial data bus node identification system configured to execute one or more diagnostic tests that identify a given node, e.g., remote terminal, component, and/or sub-system. In at least one embodiment, the node identification system performs a sorting scheme that sequentially executes different diagnostic tests according to sorting hierarchy. Each test performed at a given level of the hierarchy renders operating data corresponding to the nodes installed on the serial data base. The operating data is then used to sort the nodes into individual groups. Each level of the sorting scheme provides a different granularity among the individual groups. That is, the granularity of the sorted groups increases as the sorting scheme advances to the next level. In this manner, nodes installed on the serial data bus can be identified, and normal operating nodes can be distinguished from unidentified nodes, suspicious operating nodes, and/or or nodes that are operating differently from what is normally expected.

Figure 1:
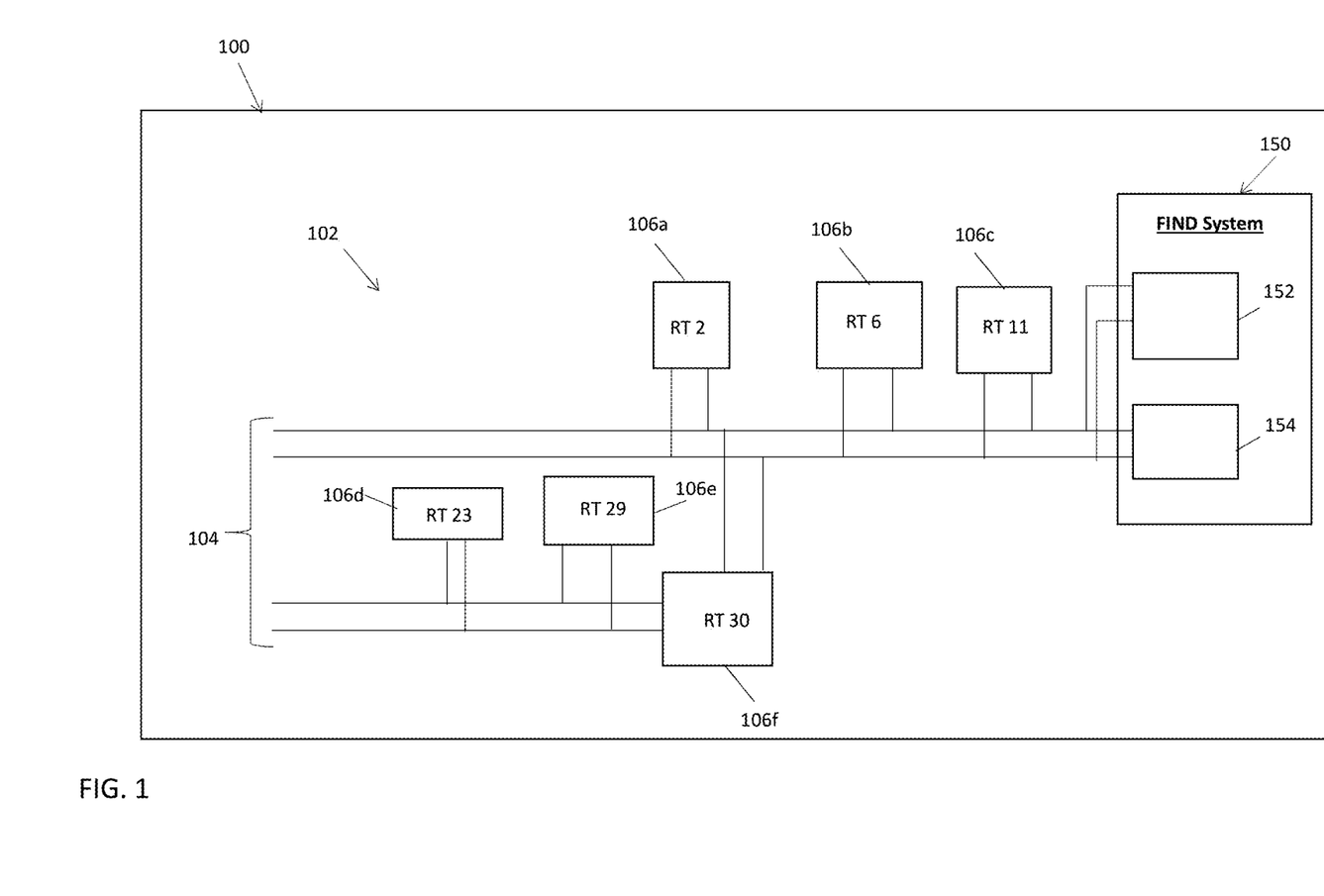
FIG. 1 is a block diagram of a vehicle including a serial data bus node identification (ID) system according to a non-limiting embodiment.

With reference now to FIG. 1, a block diagram of a vehicle 100 including a data communication network 102 is illustrated according to a non-limiting embodiment. The vehicle 100 can include, but is not limited to, an aircraft, a space vehicle, a land vehicle, a sea vessel, and an unmanned vehicle (UV) or drone.

The data communication network 102 includes a serial data bus 104 and one or more nodes 106a, 106b, 106c, 106d, 106e and 106f (106a-106f). The serial data bus 104 includes a standardized data bus such as for, example, a data bus operating according to military standard protocol 1553X (e.g., a MIL-STD-1553 data bus).

The nodes 106a-106f are in signal communication with the serial data bus 104. The nodes 106a-106f can include various components, sensors, electronic hardware controllers, remote terminals, and/or sub-systems comprising one or more circuits. Examples of the nodes include, but are not limited to, a flight avionics controller, a weapons controller, an electrical power controller, a propulsion controller, a radio circuit, an altimeter, a global positioning system, a weapons launch component, a weapons detection controller. The nodes 106a-106f can also include encoder/decoder equipment and protocol controllers, as well as other necessary components to interface to any higher layer sub-systems. Each node 106a-106f can exchange data (e.g., data messages) with one another via the serial data bus 104. One or more of the nodes 106a-106f can be readily removed and replaced with a similar type of node or a different type of node. Additional nodes (not shown) can also be readily connected to the serial data bus 104.

The data communication network 102 further includes a node identification system 150 in signal communication with the serial data bus 104. The node identification system 150 is configured to store a plurality of diagnostic tests and expected operating data (e.g., expected data results) corresponding to a given diagnostic test among the plurality of diagnostic tests. The type of operating data output by each node 106a-106f is determined by a given diagnostic test. The node identification system 150 utilizes the output operating data resulting from one or more diagnostic tests to perform a sorting scheme to sort or group the nodes 106a-106f into individual node groups (not shown in FIG. 1). In at least one embodiment, the sorted nodes are can be identified as either authentic nodes or suspicious nodes. The node identification system 150 can also generate a security alert (e.g., graphical alert, audio alert, light-emitted alert, etc.) when a suspicious node is detected.

In at least one embodiment, the node identification system 150 includes a bus message controller 152 and a bus monitoring controller 154. The bus message controller 152 is a terminal consisting of a superset of the capabilities of the nodes 106a-106f acting as a media access controller (MAC) to the serial data bus 104, utilizing a command/response protocol. In at least one embodiment, the bus message controller 152 operates in accordance with the MIL-1553x standard, and therefore can issue a command on the serial data bus 104 while the nodes 106a-106f respond to a command received from the serial data bus 104. The bus message controller 152 is further capable of initiating several different diagnostic tests (also referred to as "corner cases") that invoke the nodes 106a-106f to output different types of operating data onto the serial data bus 104.

The bus monitoring controller 154 is configured to analyze the output operating data and to sort the nodes 106a-106f into groups according to matching output operating data and non-matching output operating data. The bus monitoring controller 154 is also configured to identify an unauthorized node or suspicious when the output operating data fails to match expected operating data corresponding to a given diagnostic test.

As described herein, the node identification system 150 is configured to store a plurality of diagnostic tests and expected operating data (e.g., expected data results) corresponding to a given diagnostic test among the plurality of diagnostic tests. The diagnostic tests include, but are not limited to, a message frame diagnostic test, a status bit diagnostic test, and a node self-test diagnostic test. The individual diagnostic tests are described in greater detail below. It should be appreciated that although three diagnostic tests are described herein, additional diagnostic tests may be employed without departing from the scope of the invention.

Figure 2:
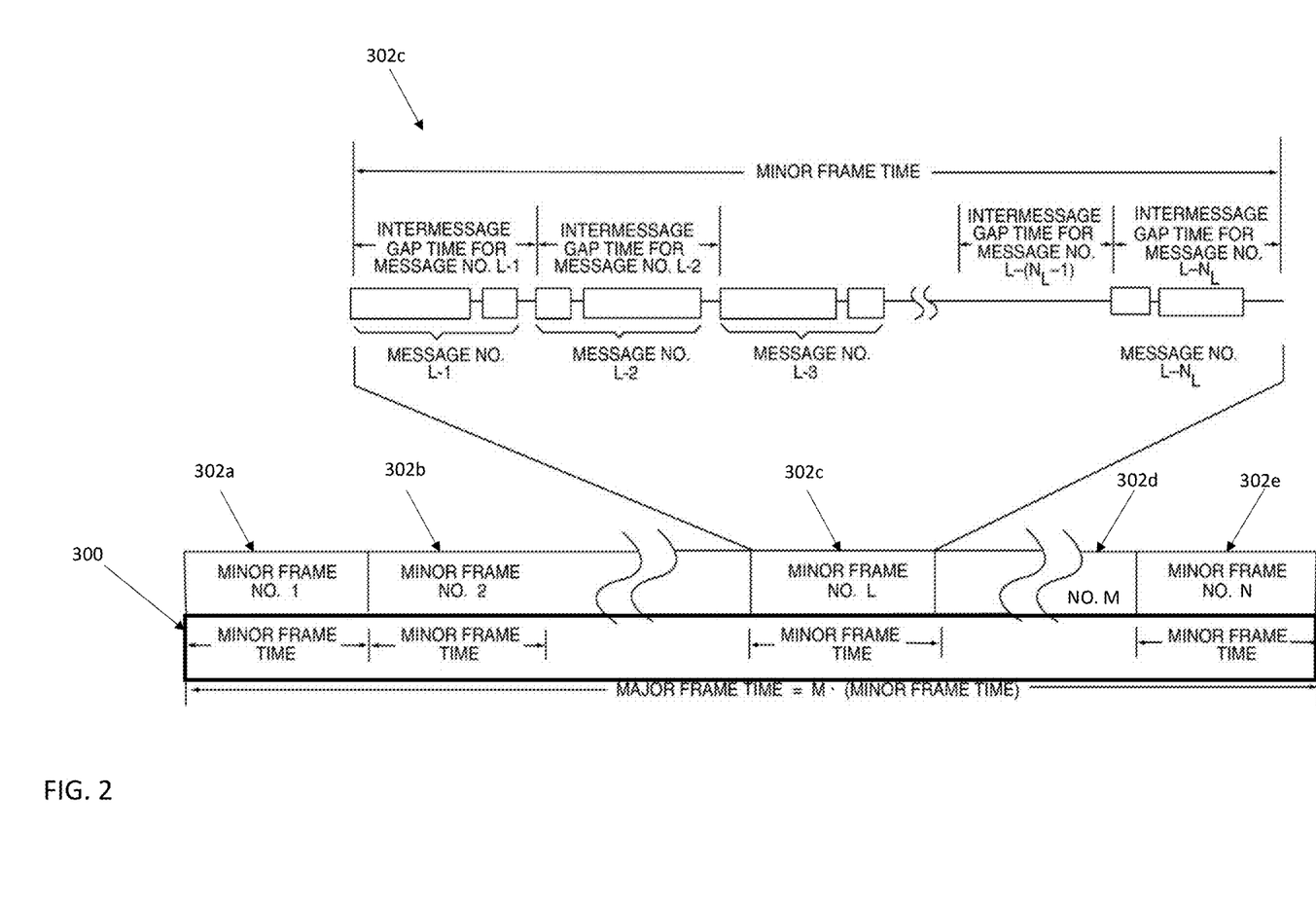
FIG. 2 is a diagram illustrating the major and minor frames associated with a frame tracking diagnostic test employed by the serial data bus node identification system according to a non-limiting embodiment.

The message frame diagnostic test tracks or monitors data message frames exchanged over the serial data bus 104 of a given vehicle 100, e.g., an aircraft. Characteristics of the data message frames are then used to identify the nodes 106a-106f. FIG. 2 illustrates the structure or characteristics of a major frame 300 and minor frames 302a, 302b, 302c, 302d, 302e (302a-302e) according to a non-limiting embodiment. The major frame 300 and minor frames 302a-302e are timed, repeating intervals of messages sent by the bus message controller 152, and can be output to poll or ping the nodes 106a-106f to reply with a message indicating their current status, or more a complicated reply message.

The major frame 300 is referred to as the overall interval that represents one message transmission cycle passed by the bus message controller 152. The major frame 300 can comprise one or more sub-intervals of messages referred to as a "minor frames" 302a-302e. Each minor frame 302a-302e can be defined by the same transmission rate or by different transmission rates. For example, each major frame 300 may include a first subset of messages A, i.e., first minor frames 302a, that are repeated four times in the span of the major frame 300. A second subset of messages B, i.e., second minor frames 302b, may repeat eight times within the major frame 300. A third subset of messages C 302c may repeat 20 times within the major frame 300, etc.

In at least one embodiment, the bus message controller 152 communicates more frequently with nodes responsible for managing critical vehicle systems and time critical information, and less frequently with nodes responsible for managing less important systems. As an example, the bus message controller 152 may ping nodes associated with a military aircraft weapons system, (e.g. a threat detection controller) very frequently, as this is time critical information. Conversely, the bus message controller 152 may contact a node associated with the navigation system (e.g., a GPS controller) once or twice during every major frame.

A given vehicle 100 is intended to implement a standardized platform that employs known nodes, e.g., known controllers, sensors, components, subsystems etc. Because the nodes installed on the vehicle 100 are known, the operating data (e.g., specifications, operating parameters, expected frame transmission times, expected transmission rates, etc.) of the nodes are also known. In addition, the relative importance of different types of nodes should not change between different individual vehicles of the same type. Accordingly, the major frames 300 and minor frames 302a-302e can be compared to the known operating data (e.g., expected frame transmission times or transmission rates) in order to identify a particular node.

Figure 3A:
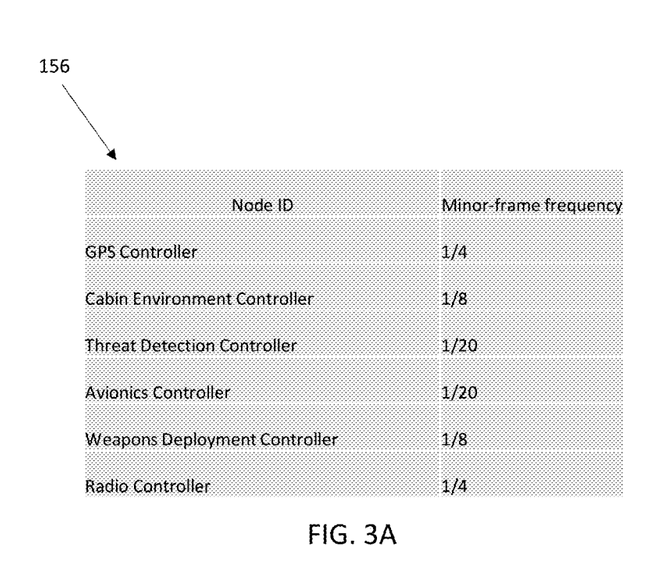
FIGS. 3A, 3B and 3C are look-up tables that index expected operating data with predetermined nodes installed on the vehicle.

For example, during the message frame diagnostic test, an unidentified node (e.g., remote terminal 11) may output operating data (e.g., a minor frame 302 having a frequency of ⅛ the major frame 300) in response to a reply message received from the bus message controller 152. The output operating data can be compared to known operating data stored in the bus monitoring controller 154. A look-up table 156 can store known operating data is indexed or cross-referenced to pre-identified nodes (controller, sensors, sub-systems, etc.) known to be installed on the vehicle 100 (see FIG. 3A). When the output operating data matches the known operating data corresponding to a weapons deployment controller, for example, the bus monitoring controller 154 can determine that the node (e.g., remote terminal 11) is a weapons deployment controller. Further, the bus message controller 154 can determine that the node is an authentic node (e.g., authentic weapons deployment controller) because the output operating data matches the expected operating data of the weapons deployment controller known to be installed on the vehicle 100.

In at least one embodiment, the message frame diagnostic test includes a set of operations executed by the node identification system 150 to identify one or more nodes 106a-106f. The operations include: connecting a node 106a-106f to the serial data bus 104; powering on the vehicle 100 and initiating a maintenance operating mode which automatically initiates message frame diagnostic test; monitoring the intervals in which messages are output from the nodes 106a-106f in response to the pings or message request; sorting or grouping nodes with similar frame frequencies together; and comparing the resulting frame frequencies with the expected frame frequencies corresponding to the known specification of a particular node.

Figure 3B:
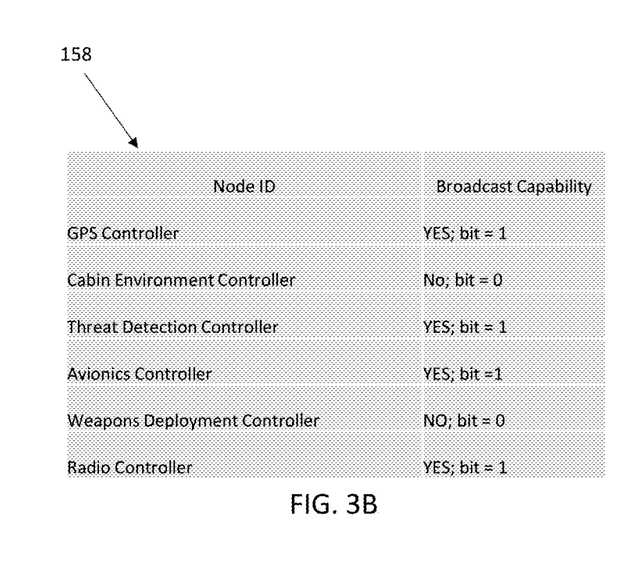

Turning now to the status bit diagnostic test, the node identification system 150 monitors receipt of a status bit such as a broadcast command status bit to identify one or more nodes. The broadcast command status bit is an optional bit in the status word of some nodes. Therefore, when the bus message controller 152 outputs a broadcast command bit request, all nodes 106a-106f installed on the serial data bit 104 receive the request, but not all of the nodes respond or have capability of acknowledging the broadcast command bit. When a node is implemented with a broadcast command status bit, the node will output a message indicating that its broadcast command bit is set to "1". The bus monitoring controller 154 can analyze the message output from the modes, and identify which nodes have the broadcast command bit set to "1". Because some nodes will be implemented with broadcast capability (i.e., the broadcast command bit set to "1") while other nodes may exclude broadcast capability (e.g., the broadcast command bit set to "0") the bus monitoring controller 154 can compare analyze a look-up table 158 that indexes or cross-references known nodes installed on the vehicle with known output data indicating whether a given node has broadcast capability (see FIG. 3B).

In at least one embodiment, the status bit diagnostic test includes a set of operations executed by the node identification system 150 to identify one or more nodes 106a-106f. The operations can utilize this functionality by: sending out a broadcast command that requests each node 106a-106f installed on the serial data bus 104 a status message; analyzing the reply messages from each node 106a-106f; identifying each node that includes a reply message setting the broadcast status bit to "1"; and determining manufacturers or nodes known to be installed which are implemented with broadcast capability.

The node self-test diagnostic test utilizes a self-test command output by the bus message controller 152, which commands each node 106a-106f to perform a self-test. In response to receiving the self-test command, a node 106a-106f will internally determine the health and operating status of its system. For example, a weapons controller of the vehicle 100 will perform a self-test to analyze the status of its circuits and/or other circuits and components of the weapons system. The results of the self-test are output to the serial data bust 104 and obtained by the bus monitoring controller 154. The bus monitoring controller 154 can monitor the amount of time a node needed to complete the self-test (i.e., test completion time). The test completion time may also be included directly with the self-test results themselves. Therefore, the bus monitoring controller 154 can determine the test completion time by simply analyzing the self-test results.

Figure 3C:
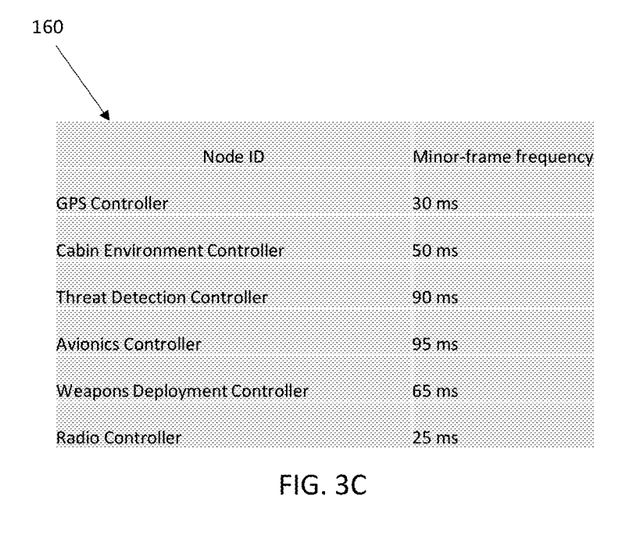

The bus monitoring controller 154 pre-stores known test completion times for each node 106a-106f installed on the vehicle 100. For example, the bus monitoring controller 154 can store look-up table 160 that indexes or cross-references known test completion times to various known nodes (components, devices, sensors, sub-systems, etc.) installed on the vehicle 100 (see FIG. 3C). Accordingly, the bus monitoring controller 154 can compare given self-test results to the known pre-stored test completion time, and identify a particular node based on a match between the test completion time corresponding to received testing results and a pre-stored test completion time.

Figure 4:
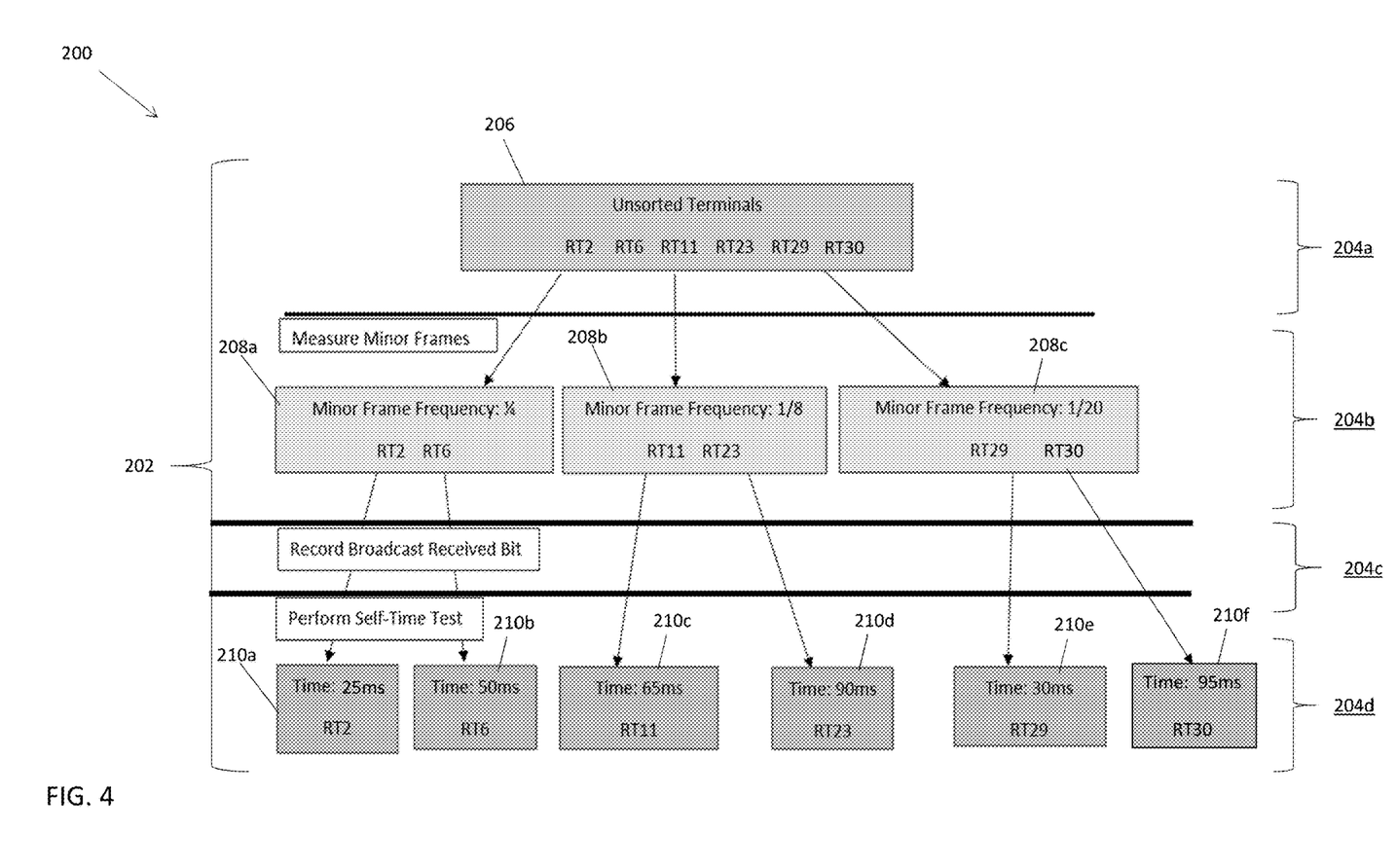
FIG. 4 is a diagram of a node sorting scheme executed by the serial data bus node identification system according to a non-limiting embodiment.

Referring to FIG. 4, a sorting scheme 200 performed by the node identification system 150 is illustrated according to a non-limiting embodiment. The sorting scheme 200 is implemented by establishing a hierarchy tree 202 that is defined by sequentially executing a different diagnostic test at different "levels" 204a, 204b, 204c, 204d, etc. of the tree 202. Node groups 206, 208a, 208b, 208c, 210a, 210b, 210c, 210d, 210e, 210f are established at a given level 204a, 204b, 204c by sorting or grouping together nodes that generate matching or similar operating results into a common group and/or sorting nodes that fail to generate matching or similar resulting into their own individual node group. In at least one embodiment, the hierarchy tree 202 is set so that the nodes are to be sorted at each level and proceeds to the next level when more information is needed to distinguish an unidentified node from the identified nodes sorted at a given level.

In at least one embodiment, an initial node group 206 including a plurality of unsorted nodes (e.g., RT2, RT6, RT11, RT23, RT29, RT30) is established at a first level 204a of the tree 202. Thereafter, the granularity of the individual node groups 208a, 208b, 208c, 210a, 210b, 210c, 210d, 210e, 210f increases following execution of each diagnostic test at the next level of the tree 204b, 204c, 204d. In at least one embodiment, increasing the granularity includes increasing a number of the node groups from one level to next level, while decreasing a number of individual nodes sorted in a given node group. For example, the granularity of the node groups increases from the second level 204b (which includes 3 node groups, each containing two nodes) to the fourth level 204d (which includes 6 node groups, each containing 1 node).

Figure 5:
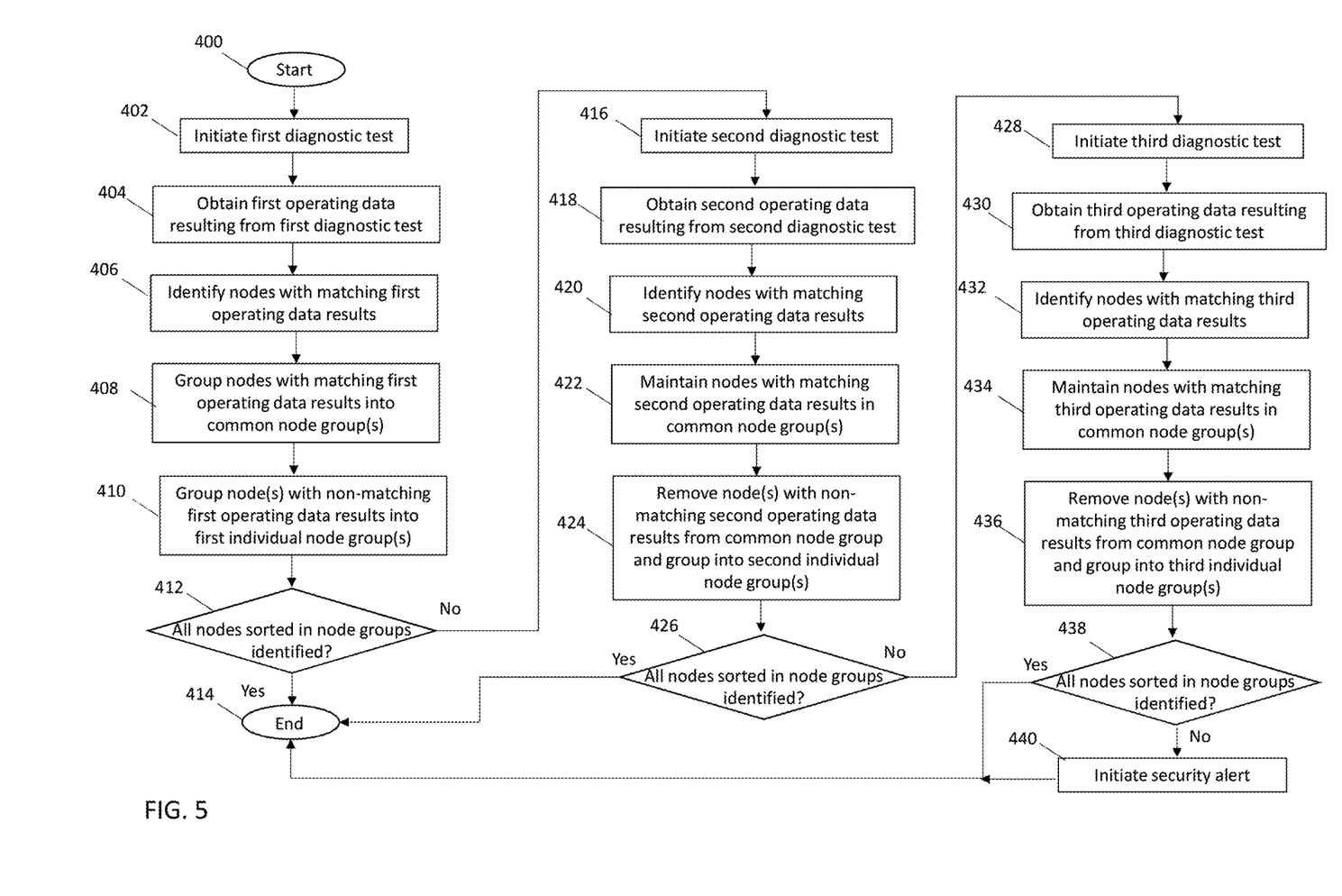
FIG. 5 is a flow diagram illustrating a method of identifying one or more nodes operating a serial data bus of a vehicle according to a non-limiting embodiment.

Turning to FIG. 5, a flow diagram illustrates a method of identifying one or more nodes operating a serial data bus of a vehicle according to a non-limiting embodiment. The method begins at operation 400, and initiates a first diagnostic test at operation 402. At operation 404, first operating data is obtained in response to executing the first diagnostic test. At operation 406, nodes with similar or matching first operating results are identified, and the matching or similar nodes are sorted into a common node group at operation 408. At operation 410, nodes with non-matching first operating data, or nodes that produce operating data noticeably different from the operating data generated by the nodes included in the common node group, are sorted into one or more first individual node groups.

At operation 412, a determination is made as to whether all the nodes sorted into a common node group or individual node group can be identified based on their generated first output date. When all the nodes can be identified, the method ends at operation 414. When, however, one or more nodes cannot be identified the method initiates another diagnostic test, e.g., a second diagnostic test, at operation 416. The second diagnostic test is different from the first diagnostic test, and therefore causes the nodes to generate second operating data at operation 418 that is different from the first operating data. At operation 420, nodes with similar or matching second operating data are identified at operation 420, and the matching or similar nodes are maintained in their common node group(s) at operation 422. At operation 424, nodes with non-matching second operating data, or nodes that produce operating data noticeably different from the second operating data, are removed from the common node group, and sorted into one or more second individual node groups.

At operation 426, a determination is made as to whether all the nodes sorted into the common node group and individual node groups can be identified based on their generated first output data and/or second output data. When all the nodes can be identified, the method ends at operation 414. When, however, one or more nodes still cannot be identified the method initiates the next diagnostic test, e.g., a third diagnostic test, at operation 428. The third diagnostic test is different from the previous diagnostic tests, e.g., the first and second tests, and therefore causes the nodes to generate third operating data at operation 430 that is different from the first and second operating data. Nodes with similar or matching third operating data are identified at operation 432, and the matching or similar nodes are maintained in their common node group(s) at operation 434. At operation 436, nodes with non-matching third operating data, or nodes that produce operating data noticeably different from the third operating data, are removed from the common node group, and sorted into one or more third individual node groups. At operation 438, a determination is made as to whether all the nodes sorted into the common node group and individual node groups can be identified based on their generated first output data, second operating data, and/or third output data. When all the nodes can be identified, the method ends at operation 414. When, however, one or more nodes still cannot be identified a security alert (e.g., a graphical alert, audio alert, light-emitted alert, etc.) is output at operation 440, and the method ends at operation 414. It should be appreciated that although three diagnostic tests are described in the flow diagram illustrated in FIG. 5, less or more diagnostic tests can be performed without departing from the scope of the invention.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements that fall within the scope of the claims that follow. These claims should be construed to maintain the proper protection for the invention first described.

What is claimed is:

1. A vehicle comprising:
  a data communication network comprising:
    a serial data bus;
    a plurality of electronic nodes in signal communication with the serial data bus;
    a node identification system configured to store a plurality of diagnostic tests and expected operating data corresponding to a given diagnostic test among the plurality of diagnostic tests, and to sort the plurality of nodes into individual node groups in response to performing one or more diagnostic tests among the plurality of diagnostic tests,
    wherein each diagnostic test among the plurality of diagnostic tests is different from one another, and wherein the diagnostic tests include a first diagnostic test that generates first operating data based on data frames generated by the bus message controller, a second diagnostic test that generates second operating data based on a broadcast command output by the bus message controller, the second operating data including a status bit output from a given node, and a third diagnostic test that generates third operating data based on a self-test command output by the bus message controller, the third operating data including a test completion time resulting from executing the self-test by a given node.

2. The vehicle of claim 1, wherein a type of output operating data varies based on the given diagnostic test initiated by the node identification system.

3. The vehicle of claim 2, wherein the node identification system sequentially executes the diagnostic tests, and wherein a granularity of the individual node groups increases following execution of each diagnostic test.

4. The vehicle of claim 3, wherein increasing the granularity includes increasing a number of the node groups while decreasing a number of individual nodes sorted in a given node group.

5. The vehicle of claim 4, wherein the node identification system comprises:
  a bus message controller configured to perform at least one diagnostic test that invokes the at least one node to output operating data; and
  a bus monitoring controller configured to analyze the output operating data and to sort nodes with matching output operating data into a common node group among the individual node groups.

6. The vehicle of claim 5, wherein the bus monitoring controller identifies an unauthorized node when the output operating data fails to match expected operating data.

7. A data communication network installed on a vehicle, the data communication network comprising:
   a serial data bus having a plurality of electronic nodes connected thereto; and
   a node identification system in signal communication with the serial data bus, the serial data bus diagnostic system configured to store a plurality of diagnostic tests and expected operating data corresponding to a given diagnostic test among the plurality of diagnostic tests, and to sort the plurality of nodes into individual node groups in response to performing one or more diagnostic tests among the plurality of diagnostic test,
   wherein each diagnostic test among the plurality of diagnostic tests is different from one another, and wherein the diagnostic tests include a first diagnostic test that generates first operating data based on data frames generated by the bus message controller, a second diagnostic test that generates second operating data based on a broadcast command output by the bus message controller, the second operating data including a status bit output from a given node, and a third diagnostic test that generates third operating data based on a self-test command output by the bus message controller, the third operating data including a test completion time resulting from executing the self-test by a given node.

8. The data communication network of claim 7, wherein a type of output operating data varies based on the given diagnostic test initiated by the node identification system.

9. The data communication network of claim 8, wherein the node identification system sequentially executes the diagnostic tests, and wherein a granularity of the individual node groups increases following execution of each diagnostic test.

10. The data communication network of claim 9, wherein increasing the granularity includes increasing a number of the node groups while decreasing a number of individual nodes sorted in a given node group.

11. The data communication network of claim 10, wherein the node identification system comprises:
   a bus message controller configured to perform at least one diagnostic test that invokes the at least one node to output operating data; and
   a bus monitoring controller configured to analyze the output operating data and to sort nodes with matching output operating data into a common node group among the individual node groups.

12. The data communication network of claim 11, wherein the bus monitoring controller identifies an unauthorized node when the output operating data fails to match expected operating data.

13. A method of identifying a plurality of nodes installed on a vehicle, the method comprising:
   connecting a plurality of electronic nodes to serial data bus; and
   storing, via a node identification system that is in signal communication with the serial data bus, a plurality of diagnostic tests, wherein each diagnostic test among the plurality of diagnostic tests being different from one another;
   storing, via the node identification system, expected operating data corresponding to a given diagnostic test among the plurality of diagnostic tests;
   initiating at least one of the diagnostic tests such that the nodes output operating data; and
   sorting the plurality of nodes into individual node groups based on the output operating data obtained in response to in response to performing the at least one of the diagnostic tests,
   wherein the diagnostic tests include a first diagnostic test that generates first operating data based on data frames generated by the bus message controller, a second diagnostic test that generates second operating data based on a broadcast command output by the bus message controller, the second operating data including a status bit output from a given node, and a third diagnostic test that generates third operating data based on a self-test command output by the bus message controller, the third operating data including a test completion time resulting from executing the self-test by a given node.

14. The method of claim 13, wherein initiating the at least one diagnostic test includes sequentially executing the diagnostic tests such that a granularity of the individual node groups increases following execution of each diagnostic test.

15. The method of claim 14, wherein increasing the granularity includes increasing a number of the node groups while decreasing a number of individual nodes sorted in a given node group.

16. The method of claim 15, further comprising identifying an unauthorized node when the output operating data fails to match any of the expected operating data.

* * * * *